United States Patent
Yanagi

(10) Patent No.: US 9,280,673 B2
(45) Date of Patent: Mar. 8, 2016

(54) SELECTIVELY ALLOWING EXECUTION OF A CONTROL COMMAND ASSOCIATED WITH A PAGE DESCRIPTION LANGUAGE IN AN IMAGE FORMING APPARATUS

(71) Applicant: Yoshihide Yanagi, Tokyo (JP)

(72) Inventor: Yoshihide Yanagi, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/066,100

(22) Filed: Oct. 29, 2013

(65) Prior Publication Data

US 2014/0118774 A1    May 1, 2014

(30) Foreign Application Priority Data

Oct. 31, 2012   (JP) .................................. 2012-241086

(51) Int. Cl.
*G06F 3/12* (2006.01)
*G06F 21/60* (2013.01)

(52) U.S. Cl.
CPC .................................. *G06F 21/608* (2013.01)

(58) Field of Classification Search
CPC .... G06F 3/1238; G06F 3/1239; G06F 21/608
USPC ...................... 358/1.14, 1.15, 1.16
See application file for complete search history.

(56) References Cited

U.S. PATENT DOCUMENTS

| 2007/0273915 | A1* | 11/2007 | Nakagawa | ................... 358/1.14 |
| 2008/0007758 | A1* | 1/2008 | Miyashita | ................... 358/1.14 |
| 2009/0138965 | A1* | 5/2009 | Ferlitsch | ........................ 726/21 |
| 2011/0242579 | A1 | 10/2011 | Pinney | |

FOREIGN PATENT DOCUMENTS

| JP | 2011-216089 | 10/2011 |
| JP | 2012-058930 | 3/2012 |

* cited by examiner

*Primary Examiner* — Eric A Rust
(74) *Attorney, Agent, or Firm* — Harness, Dickey & Pierce, P.L.C.

(57) ABSTRACT

Disclosed is an image forming apparatus that connects to a device. The image forming apparatus includes a storage unit that stores, for each types of page description languages for describing printing data, permission information indicating whether execution of a control command described in the corresponding page description language is allowed; a receiving unit that receives the control command transmitted from the device; a determination unit that determines whether the execution of the control command is allowed for the image forming apparatus, based on the permission information being stored in the storage unit; and a controller that controls the image forming apparatus. When the execution of the image forming apparatus is disallowed for the image forming apparatus, the controller prevents the image forming apparatus from executing the control command.

19 Claims, 18 Drawing Sheets

FIG.4

| TYPE OF PDL | CORRESPONDING PARSING UNIT |
|---|---|
| PJL | PARSING UNIT 1 |
| RPDL | PARSING UNIT 2 |
| PDF | PARSING UNIT 3 |
| PostScript | PARSING UNIT 4 |

| TYPE OF PDL | FILE SYSTEM OPERATION |
|---|---|
| PJL | ALLOWED |
| RPDL | DISALLOWED |
| PDF、PostScript | ALLOWED |
| ... | ... |

| | FILE ACCESS COMMAND |
|---|---|
| PJL | @PJL FSMKDIR NAME="0:¥ANY DIRECTORY NAME"<br>@PJL FSDELETE NAME="0:¥ANY FILE MANE" |
| PostScript | (%disk0%ANY FILE MANE)(w) file<br>(%disk0%ANY FILE MANE)(r) file read<br>(%disk0%ANY FILE MANE) (%disk0%ANY FILE MANE) renamefile |

FIG.8A

RNP002673441197A-Web Image Monitor

☆ FAVORITE   RNP002673441197A

ABC PRINTER

GENERAL USER → LOG-OUT

📧 UPDATE TO THE LATEST INFORMATION ?

PAGE DESCRIPTION LANGUAGE FILE SYSTEM OPERATION ALLOWED / DISALLOWED SETTING

| PAGE DESCRIPTION LANGUAGE | FILE SYSTEM OPERATION |
|---|---|
| PJL | DISALLOWED |
| RPDL | ALLOWED |
| PDF, PostScript | DISALLOWED |

RETURN

PAGE IS DISPLAYED   LOCAL INTRANET | PROTECTION MODE : INVALID | 100%

FIG.13

FILE ACCESS RESULT

FILE ACCESS IS DISALLOWED.
THE FILE ACCESS BASED ON THE USED PAGE
DESCRIPTION LANGUAGE IS DISALLOWED.

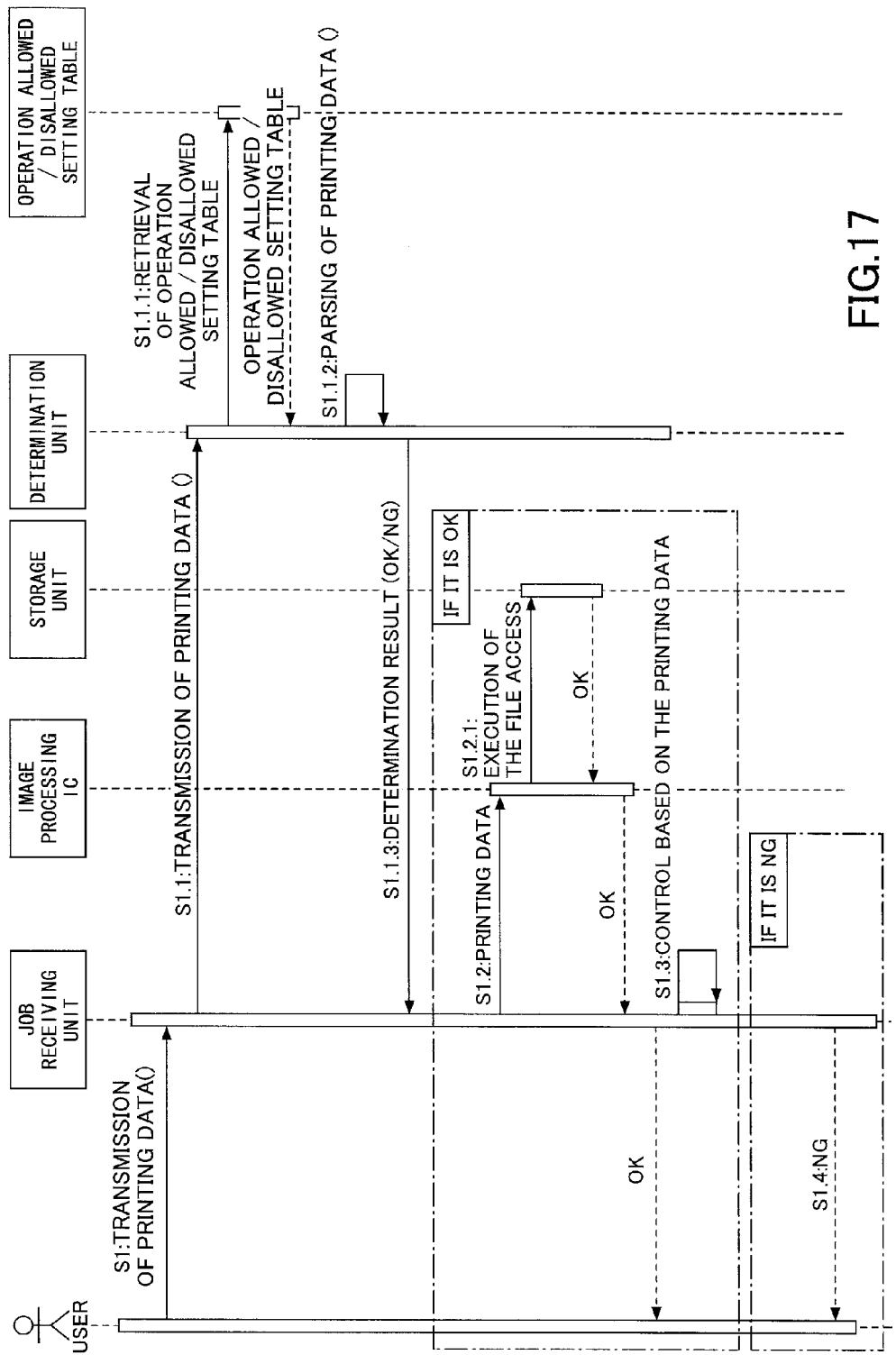

SELECTIVELY ALLOWING EXECUTION OF A CONTROL COMMAND ASSOCIATED WITH A PAGE DESCRIPTION LANGUAGE IN AN IMAGE FORMING APPARATUS

BACKGROUND OF THE INVENTION

1. Field of the Invention

The present invention relates to an image forming apparatus that receives printing data from a device which is connected to the image forming apparatus through a network.

2. Description of the Related Art

An image forming apparatus includes an internal storage device for storing printing data which is received from a personal computer (PC). The internal storage device is a hard disk, for example. However, the printing data may leak from the internal storage device. Further, it is known that a fraudulent operation may be performed on the image forming apparatus through the internal storage device.

The printing data which is transmitted from the PC to the image forming apparatus is described in a Page Description Language (PDL). A language specification of the PDL includes a function to operate a file system of the internal storage device of the image forming apparatus. Accordingly, it is possible for an outsider to create printing data for removing, editing, and/or reading a file in accordance of the script language of the PDL (e.g., PJL, PCL, RPDL, PDF, or PostScript), which is supported by the image forming apparatus, and access the internal storage device.

As a countermeasure, it may be considered to restrict access to the internal storage device (cf. Patent Document 1 (Japanese Unexamined Patent Publication No. 2011-216089), for example). Patent Document 1 discloses a technique for allowing or denying access to a printer language execution system depending on a user. In an image forming apparatus according to Patent Document 1, when a user requests to execute a printer language command for the image forming apparatus, the image forming apparatus determines whether the user is granted a right to execute the printer language command, based on a printer language policy setting for the user. When the image forming apparatus determines that the user is granted the right to execute the printer language command, the image forming apparatus executes the command.

Unfortunately, for protection of the internal storage device, it is not sufficient only to restrict execution of a PDL command on a user-by-user basis. In many cases, an image forming apparatus supports a plurality of page description languages. Depending on a page description language, ease of handling the page description language or an extent of disclosure of the grammar varies. For example, since the PostScript is text-based, it is easy to create printing data by the PostScript. In contrast, since the RPDL (registered trademark) is binary-based, and its grammar is not disclosed to a general user, it is difficult to create printing data by the RPDL.

Even if a user, who is allowed to execute a PDL command, does not have any malicious intent, if the user creates printing data by the PostScript and accesses a file in the internal storage device, it is possible that the file in the internal storage device is leaked or altered.

There is a need for enhancing security of an image forming apparatus when the image forming apparatus performs a predetermined control according to received printing data.

SUMMARY OF THE INVENTION

According to an aspect of the present invention, there is provided an image forming apparatus configured to connect to a device. The image forming apparatus includes a storage unit configured to store, for each of types of page description languages for describing printing data permission information indicating whether execution of a control command described in a page description language is allowed; a receiving unit configured to receive the control command transmitted from the device; a determination unit configured to determine whether the execution of the control command is allowed for the image forming apparatus, the control command being received by the receiving unit, based on the permission information being stored in the storage unit; and a controller configured to control the image forming apparatus. When the image forming apparatus is disallowed to execute the control command, the controller is configured to prevent the image forming apparatus from executing the control command.

According to another aspect of the present invention, there is provided an instruction execution method of executing a control command by an image forming apparatus configured to connect to a device. The method includes a step of storing, for each types of page description languages for describing printing data, permission information indicating whether execution of a control command described in a page description language is allowed; a step of receiving the control command transmitted from the device; a step of determining whether the execution of the control command is allowed for the image forming apparatus, the control command being received by the receiving unit, based on the permission information being stored in the storage unit; and a step of controlling the image forming apparatus. When the execution of the control command is disallowed for the image forming apparatus, the step of controlling prevents the image forming apparatus from executing the control command.

According to another aspect of the present invention, there is provided a printing system including an image forming apparatus and a device, wherein the image forming apparatus is configured to connect to the device. The image forming apparatus includes a storage unit configured to store, for each of types of page description languages for describing printing data, permission information indicating whether execution of a control command described in a page description language is allowed; a receiving unit configured to receive the control command transmitted from the device; a determination unit configured to determine whether the execution of the control command is allowed for the image forming apparatus, the control command being received by the receiving unit, based on the permission information being stored in the storage unit; and a controller configured to control the image forming apparatus. When the execution of the control command is disallowed for the image forming apparatus, the controller is configured to prevent the image forming apparatus from executing the control command.

With such a configuration, security of the image forming apparatus can be enhanced during execution of the predetermined control based on the received printing data.

Other objects, features and advantages of the present invention will become more apparent from the following detailed description when read in conjunction with the accompanying drawings.

BRIEF DESCRIPTION OF THE DRAWINGS

FIG. 4 is a diagram showing an example of a page description language selection table;

FIG. 5 is a diagram showing an example of an operation allowed/disallowed setting table;

FIG. 6 a diagram showing examples of file access commands, which are registered in advance for each page description language;

FIGS. 8A and 8B are diagrams showing examples of screen images which are displayed on a user's PC;

FIG. 13 is a diagram showing an example of a display screen of the user PC which displays an execution result of a command;

FIG. 17 is a sequence diagram showing an example of a procedure for the image forming apparatus to access a file in accordance with the page description language.

DETAILED DESCRIPTION OF THE PREFERRED EMBODIMENTS

Hereinafter, an embodiment for implementing the present invention is explained by referring to the accompanying drawings.

Figure 1:
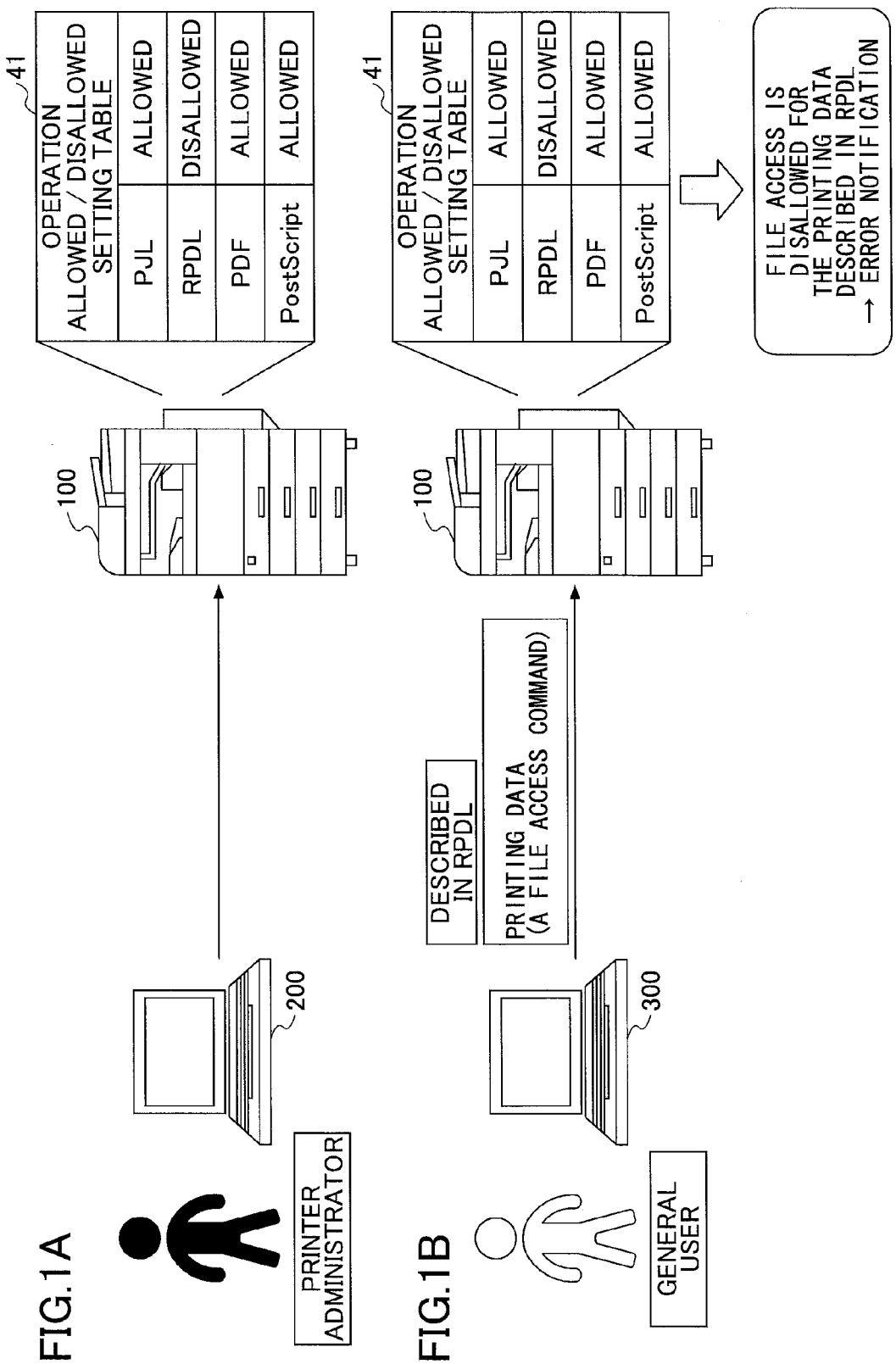
FIGS. 1A and 1B are diagrams illustrating examples of schematic features of an image forming apparatus according to an embodiment.

FIGS. 1A and 1B are diagrams illustrating examples of schematic features of an image forming apparatus according to an embodiment.

(1) First, a printer administrator registers an operation allowed/disallowed setting table 41 to the image forming apparatus 100. The printer administrator operates a printer administrator's personal computer (PC) 200 to communicate with the image forming apparatus 100, and the printer administrator obtains a list of Page Description Languages (PDL), which are supported by the image forming apparatus 100.

The printer administrator operates the printer administrator's PC 200, and the printer administrator sets, for each of the page description languages, whether file access is allowed. The image forming apparatus 100 stores the contents of the setting as the operation allowed/disallowed setting table 41. As shown in FIG. 1A, in the operation allowed/disallowed setting table 41, a setting is made as to whether the file access is "allowed" or "disallowed" for each of the page description languages. (2) A user who uses the image forming apparatus 100 creates printing data with a predetermined page description language (which is RPDL in FIG. 1B), and the printing data is transmitted to the image forming apparatus 100. Then, the image forming apparatus 100 determines whether a file access command is included in the printing data. When the printing data includes the file access command, the image forming apparatus 100 determines in which page description language the printing data is described. Then, the image forming apparatus 100 determines whether the file access is allowed for the page description language in the operation allowed/disallowed setting table 41.

When the file access is allowed, the image forming apparatus 100 accesses a file. When the file access is disallowed, the image forming apparatus 100 reports an error message to the user, without accessing the file. For the case of FIG. 1B, since the file access is disallowed for the print data which is described in the RPDL, an error message is reported.

As described above, the image forming apparatus 100 according to the embodiment can prohibit file access based on a particular page description language, for which the file access is disallowed. Accordingly, security of the storage device can be improved for a case in which the particular page description language is utilized. Here, the particular page description language is supported by the image forming apparatus 100, and the printing data can be easily edited with the particular page description language. The printer administrator may access the file by using a specific page description language. Here, it is difficult to edit print data by using the specific page description language.

[Configuration Example]

Figure 2:
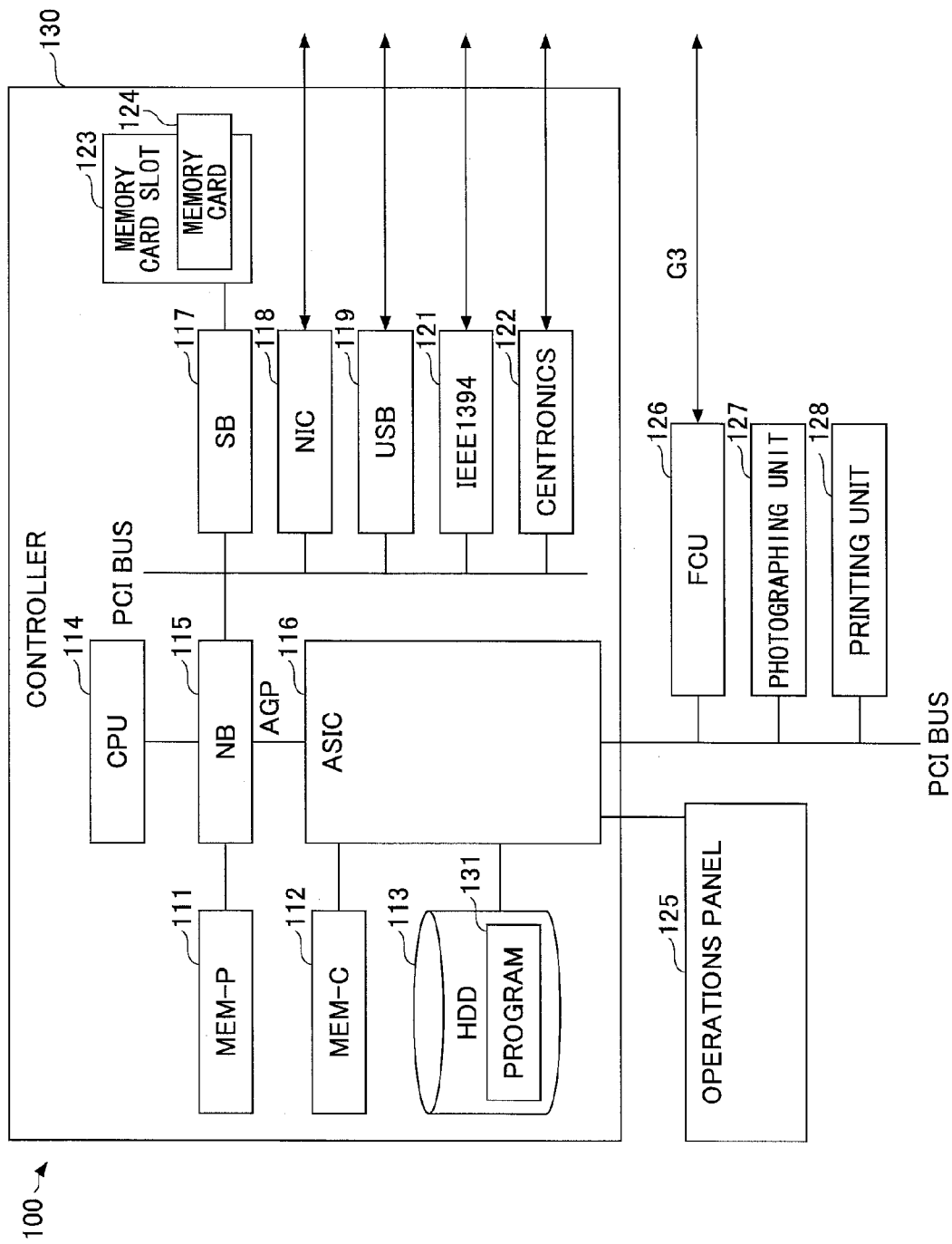
FIG. 2 is a diagram showing an example of a hardware configuration of the image forming apparatus.

FIG. 2 is a diagram showing an example of a hardware configuration of the image forming apparatus 100. The image forming apparatus 100 includes a controller 130; an operations panel 125; a facsimile control unit (FCU) 126; a photographing unit 127; and a printing unit 128.

The controller 130 includes a CPU 114; an ASIC 116; a north bridge (NB) 115; a south bridge (SB) 117; a system memory (MEM-P) 111; a local memory (MEM-C) 112; a hard disk drive (HDD) 113; a memory card slot 123; a network interface controller (NIC) 118; a USB device 119; an IEEE 1394 device 121; and a centronics device 122.

The CPU 114 is an IC for performing various types of information processing. The CPU 114 processes an application, a platform, and/or an option package in a parallel manner on a process-by-process basis by an operating system (OS) such as the UNIX (registered trademark). The ASIC 116 is an IC for image processing. The NB 115 is a bridge for connecting the CPU 114 with the ASIC 116. The SB 117 is a bridge for connecting the NB 115 with peripheral devices. The ASIC 116 is connected to the NB 115 through an accelerated graphics port (AGP).

The MEM-P 111 is a memory, which is connected to the NB 115. The MEM-C 112 is a memory, which is connected to the ASIC 116. The HDD 113 is a storage, which is connected to the ASIC 116. The HDD 113 is used for storing image data; document data; programs; font data; and form data, for example. The HDD 113 stored the above-described various types of applications and a program 131.

The memory card slot 123 is connected to the SB 117, and the memory card slot 123 is used for setting (inserting) a memory card 124. The memory card 124 is a flash memory such as a USB memory or a SD memory. The memory card 124 is used for distributing the program 131. Alternatively, the program 131 may be downloaded from a predetermined server to the image forming apparatus 100.

The NIC 118 is a controller for performing data communication through a network 400, for example. In the data communication, a MAC address or the like is utilized. The USB device 119 is a device for providing a serial port, which conforms to the USB standard. The IEEE 1394 device 121 is a device for providing a serial port, which conforms to the IEEE 1394 standard. The centronics device 122 is a device for providing a parallel port, which conforms to the Centronics specification. The NIC 118, the USB device 119, the IEEE 1394 device 121, and the centronics device 122 are connected to the NB 115 and the SB 117 through a peripheral component interconnect (PCI) bus.

The operations panel 125 is hardware (an operation unit) for a user to input to the image forming apparatus 100. At the same time, the operations panel 125 is hardware (a display unit) for the image forming apparatus 100 to display a menu screen. The operations panel 125 is connected to the ASIC 116. The FCU 126, the photographing unit 127, and the printing unit 128 are connected to the ASIC 116 through a peripheral component interconnect (PCI) bus.

Figure 3:
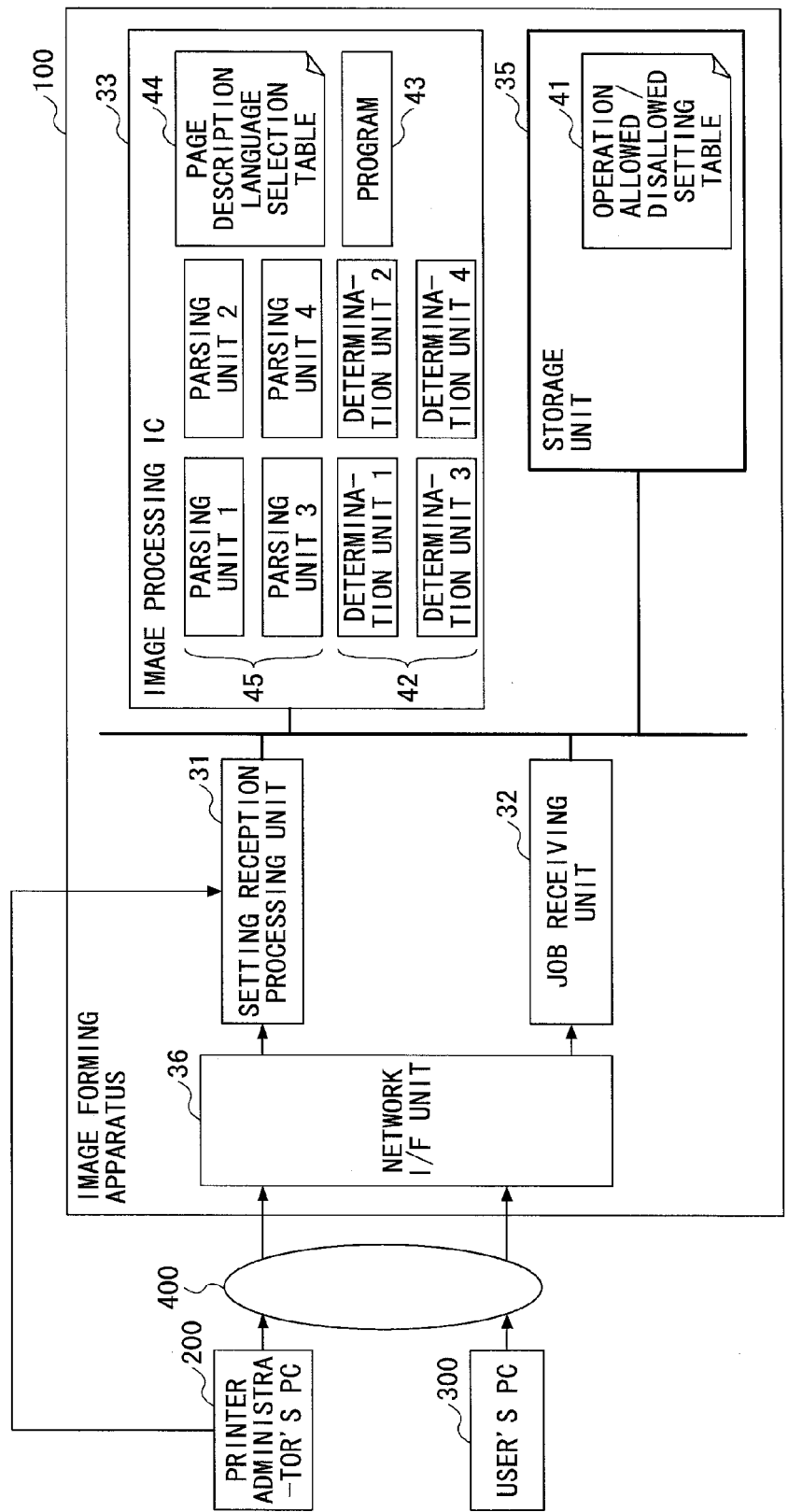
FIG. 3 is a diagram showing an example of functional blocks of the image forming apparatus.

FIG. 3 is a diagram showing an example of functional blocks of the image forming apparatus 100. The image forming apparatus 100 is connected to the printer administrator's PC 200 and to the user's PC 300 through the network 400. The image forming apparatus 100 includes a network I/F unit 36; a setting receiving processing unit 31; a job receiving unit 32; an image processing IC 33; and a storage unit 35. The setting reception processing unit 31, the job receiving unit 32, the image processing IC 33, and the storage unit 35 are mutually accessible. The image processing IC 33 includes a parsing unit 45 (which is referred to as parsing units 1-4, hereinafter), a page description language selection table 44, a determination unit 42 (which is referred to as determination units 1-4, hereinafter), and a program 43. The storage unit 35 stores the operation unit 35 may be disposed outside the image forming apparatus 100.

The printer administrator operates the printer administrator's PC 200. The user operates the user's PC 300. The printer administrator is a person who is entitled to register the operation allowed/disallowed setting table 41. The user is a person who transmits print data to the image forming apparatus 100. The printer administrator's PC 200 and the user's PC 300 are communicatably connected to the network I/F unit 36 of the image forming apparatus 100 through the network 400. The network 400 is a local area network (LAN), for example. The network 400 may be a wide area network (WAN), such as the Internet, to which a plurality of LANs is connected through corresponding routers. The LAN may be a wired LAN. Alternatively, a portion of the LAN may be a wireless LAN, or the LAN may be a wireless LAN. Here, the state in which the printer administrator's PC 200 and the user's PC 300 are connected to the image forming apparatus 100 through the network 400 includes a state in which the printer administrator's PC 200 or the user's PC 300 is connected to (corresponds one-to-one to) the image forming apparatus 100 through a USB cable or a LAN cable.

Each of the printer administrator's PC 200 and the user's PC 300 is an information processing device that includes a CPU, a ROM, a RAM, a HDD, a network card, a mouse, a keyboard, a display, and the like. The printer administrator's PC 200 may be a smart phone, a tablet terminal, a personal digital assistant (PDA), or a cellular phone. The user's PC 300 may be a smart phone, a tablet terminal, a personal digital assistant (PDA), or a cellular phone.

The network I/F unit 36 is a protocol stack that processes, for example, the Ethernet (registered trade mark) and the upper layer protocols (such as the TCP/IP, Internet Printing Protocol (IPP), Server Message Block (SMB), or FTP). The network I/F unit 36 assigns the contents of the setting of the operation allowed/disallowed setting table 41 (which is received from the printer administrator's PC 200) to the setting reception processing unit 31, and the printing job (which is received from the user's PC 300) to the job receiving unit 32.

The printing data is data which is described in a page description language. Examples of the page description language include the Printer Job Language (PJL), the Printer Control Language (PCL), RPDL (registered trademark), the Portable Document Format (PDF), or the PostScript (registered trademark). The printing data includes a printing condition and printing target data. The printing condition includes a paper sheet size, a number of copies, a double-sided setting, and a stapling setting, for example. According to the specifications of the page description languages, the user can describe a control command for operating the file system of the image forming apparatus 100.

The job receiving unit 32 is achieved by executing a program, which is stored in the HDD 113 of FIG. 2, by the CPU 114. The job receiving unit 32 holds the printing data received from the user's PC 300 on a job-by-job basis. The job receiving unit 32 transmits the printing data to the image processing IC 33 on the job-by-job basis. In addition, the job receiving unit 32 may distribute jobs for corresponding applications. For example, the job receiving unit 32 may store a job in a document box prior to printing, or the job receiving unit 32 may perform facsimile transmission of a job.

The ASIC 116 of FIG. 2 corresponds to the image processing IC 33. A processor included in the image processing IC 33 achieves the determination units 1-4 by executing the program 43. The parsing units 1-4 perform parsing of the corresponding page description languages. Each of the determination units 1-4 determines whether the file access based on the corresponding page description language is allowed. Here, the printing data may be described in any one of the page description languages. Since the above-described determination is made for each of the page description languages, the number of the determination units 1-4 is the same as the number of the parsing units 1-4.

The storage unit 35 corresponds to the HDD 113, the MEM-P 111, or MEM-C 112 of FIG. 2. The page description language selection table 44 is a table for selecting one of the parsing units 1-4, which conforms to the page description language.

FIG. 4 shows an example of the page description language selection table 44. In the page description language selection table 44, the types of the page description languages and the parsing units 1-4 which can parse the corresponding page description languages (PDLs) are registered while the parsing units 1-4 are associated with the corresponding types of the page description languages (PDLs). Any one of the parsing units 1-4 may be selected by a corresponding address or a corresponding enable (selection signal) line. The image processing IC 33 determines in which page description language the printing data is described by a header portion of the printing data. For example, for a case of the PostScript, it can be determined that the printing data is described in the PostScript by the first line of the print data, which is "%!PS-Adobe-3.0."

The printing data includes a control command and printing target data. The printing target data includes information for identifying a character, image data, and graphics data; position information thereof; and format information such as color and size. The parsing units 1-4 retrieve the printing data, which is transmitted by the user, from the job receiving unit 32. The parsing units 1-4 parse the printing data which is described in a page description language, and the parsing units 1-4 perform some processing, such as rendering (converts the printing data into bit map data), and transmits the processed data to a printing engine. The bit map data is stored in a line memory (not shown), and skew correction, jaggy correction, thickening processing, and the line are applied.

Each of the parsing units 1-4 is implemented as a dedicated circuit or an Intellectual Property (IP) core. However, each of the parsing units 1-4 may be implemented as software. As the software, en emulation program may be utilized. Emulation means to execute software, which is developed for specific hardware A, on hardware B having a different configuration. An emulation program is software that replicates the specific hardware A on the hardware B having the different configuration. By introducing such an emulation program, the image forming apparatus 100 can execute a program for parsing a page description language without depending on a hardware configuration. Here, even if the emulation program is utilized, the program may be a program which is specific to particular hardware.

The setting reception processing unit 31 is achieved by executing a program, which is stored in the HDD 113 of FIG. 2, by the CPU 114. The setting reception processing unit 31 sets the contents of the setting, which is transmitted from the printer administrator's PC 200, to the operation allowed/disallowed setting table 41. Here, the printer administrator may set the operation allowed/disallowed setting table 41 by operating the operations panel 125.

The CPU 114 operates by executing the program 131 which is stored in the HDD 113. The CPU 114 centrally controls the whole image processing apparatus 100. The CPU 114 manages printing data which is received by the job receiving unit 32 and a job which is received by the operations panel 125, and the CPU 114 executes the job by controlling the job receiving unit and/or the image processing IC 33. Additionally, the CPU 114 can access the storage unit 35.

[Operation allowed/disallowed setting table]

FIG. 5 is a diagram showing an example of the operation allowed/disallowed setting table 41. A setting method of the operation allowed/disallowed setting table 41 is described later. In the operation allowed/disallowed setting table 41, for each of the page description languages (which are the Printer Job Language (PJL), the Ricoh Page Description Language (RPDL), the Portable Document Format (PDF), and the PostScript), a setting is made as to whether the file access is "allowed" or "disallowed." Additionally, the Printer Control Language (PCL) may be included in the page description languages. The operation allowed/disallowed setting table 41 may be stored in any position within the image forming apparatus 100.

For printing data in which a control command for performing file access to a file of the storage unit 35 is described, the parsing units 1-4 of the image processing IC 33 parse the control command, and the parsing units 1-4 perform the file access to the storage unit 35 in accordance with the parsed contents. However, if the determination units 1-4 refer to the operation allowed/disallowed setting table 41, and find that the print data is described in a page description language for which the file access is disallowed, the determination units 1-4 prohibits the file access to the storage unit 35.

The control command for performing file access varies depending on the page description language. However, for example, the control commands described below are commands for performing the file access.

(i) For the PJL

@PJL FSMKDIR NAME="0:¥pcl"

This control command is a command such that "create a directory having a name of "pcl" in the HDD."

@PJL FSDELETE NAME="0:¥pcl¥¥Name"

This control command is a command such that "delete a file having a name of "Name" in the pcl directory in the HDD."

(ii) For the PostScript (% disk0% test1.txt)(w) file This control command is a command such that "create test1.txt in %disk0% (an area within the HDD).

(% disk0% test1.txt)(r) file read

This control command is a command such that "read test1.txt in % disk0%."

(% disk0% test1.txt) (% disk0% test2.txt) renamefile

This control command is a command such that "rename test1.txt in %disk0% to test2.txt."

As shown in FIG. 6, the determination unit 42 holds, for each of the page description languages, commands for performing file access in advance. The determination unit 42 determines whether the printing data received by the job receiving unit 32 includes any one of the file access commands, which are shown in FIG. 6. If one of the file access commands is included, the determination unit 42 determines whether file access based on the page description language, with which the printing data is described, is prohibited by referring to the operation allowed/disallowed setting table 41.

In some cases, it may be necessary for the image processing IC 33 to access the storage unit 35 so as to perform a process, such as a rendering process. For example, when the image processing IC 33 retrieves font data or layout data, the image processing IC 33 may access the storage unit 35. Such a mandatory file access occurs during a rendering process. However, since such a mandatory file access is not based on the explicit file access commands which are shown in FIG. 6, it can be distinguished (namely, the file access which is required for the rendering process or the like can be allowed).

[Setting of the operation "allowed/disallowed" setting table]

Setting of the operation allowed/disallowed setting table 41 may be made by the printer administrator by communicating with the setting reception processing unit 31 through the network 400 and the network I/F unit 36.

First, the printer administrator operates the printer administrator's PC 200 and executes browser software, and the printer administrator sets an IP address of the image forming apparatus 100. By doing this, the printer administrator's PC 200 is enabled to communicate with the image forming apparatus 100 by a protocol, such as the TCP/IP and the HTTP. When the communication is enabled, the printer administrator transmits a password and an ID to the image forming apparatus 100. The setting reception processing unit 31 determines whether the combination of the password and the ID matches with a stored one, and if it matches with the stored one, the setting reception processing unit 31 allows the log-in.

Figure 7A:
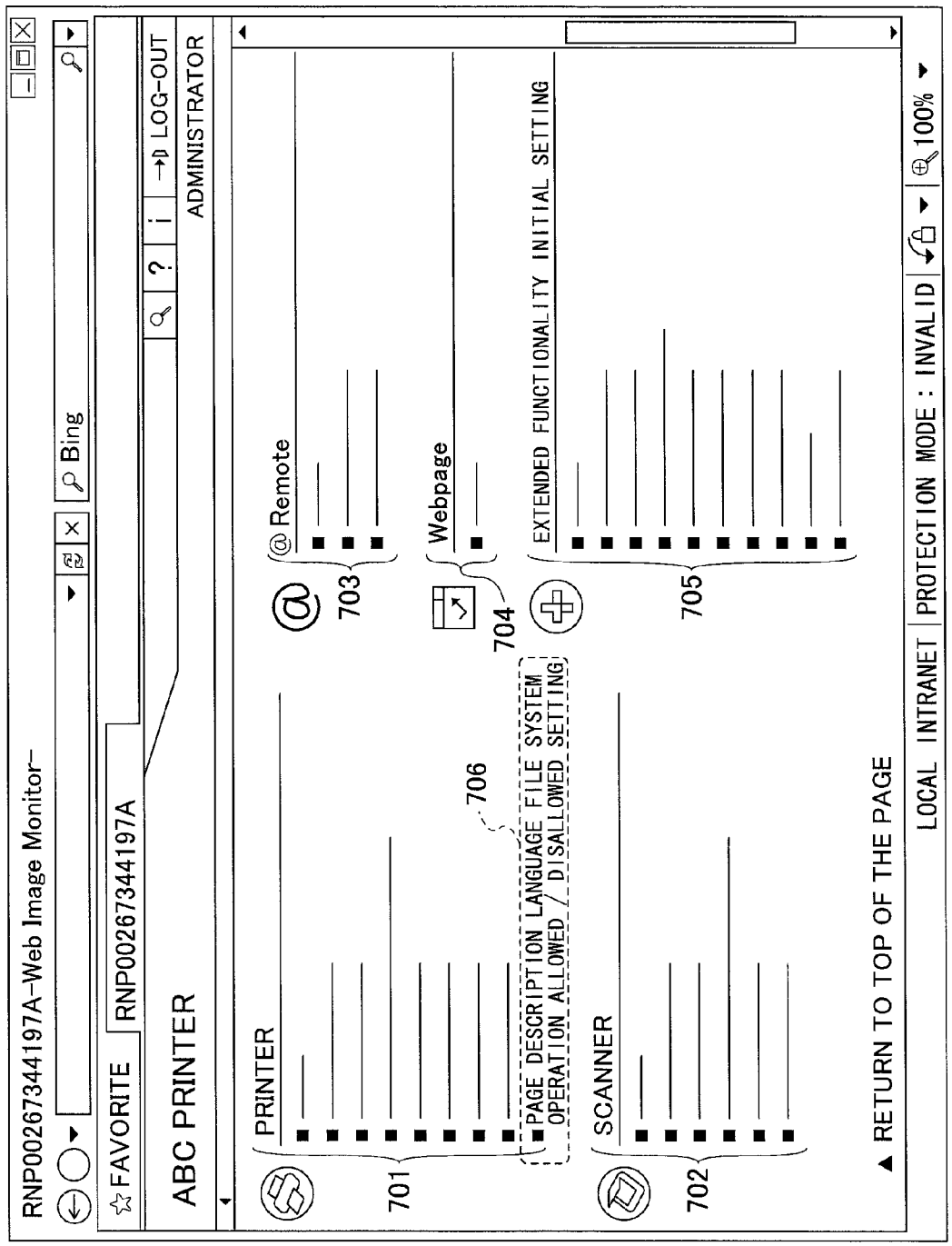
FIGS. 7A and 7B are diagrams showing examples of screen images which are displayed on a printer administrator's PC during setting of the operation allowed/disallowed setting table.

Subsequently, the setting reception processing unit 31 transmits HTML data to the printer administrator's PC 200. In this manner, the menu screen which is shown in FIG. 7A is displayed. FIG. 7A is a diagram showing an example of the menu screen which is displayed on the printer administrator's PC 200 during setting of the operation approval/disapproval table 41. The menu screen includes a printer setup menu 701; a scanner setup menu 702; a Remote setup menu 703; a WebPage setup menu 704; and an extended functionality initial setting setup menu 705. The printer administrator presses a "page description language file system operation approval/disapproval setting" button 706 of the printer setup menu for setting the operation allowed/disallowed setting table 41. The setting reception processing unit 31 receives this operation, and subsequently the setting reception processing unit 31 transmits HTML data for displaying the operation approval/disapproval setting screen to the printer administrator's PC 200.

Figure 7B:
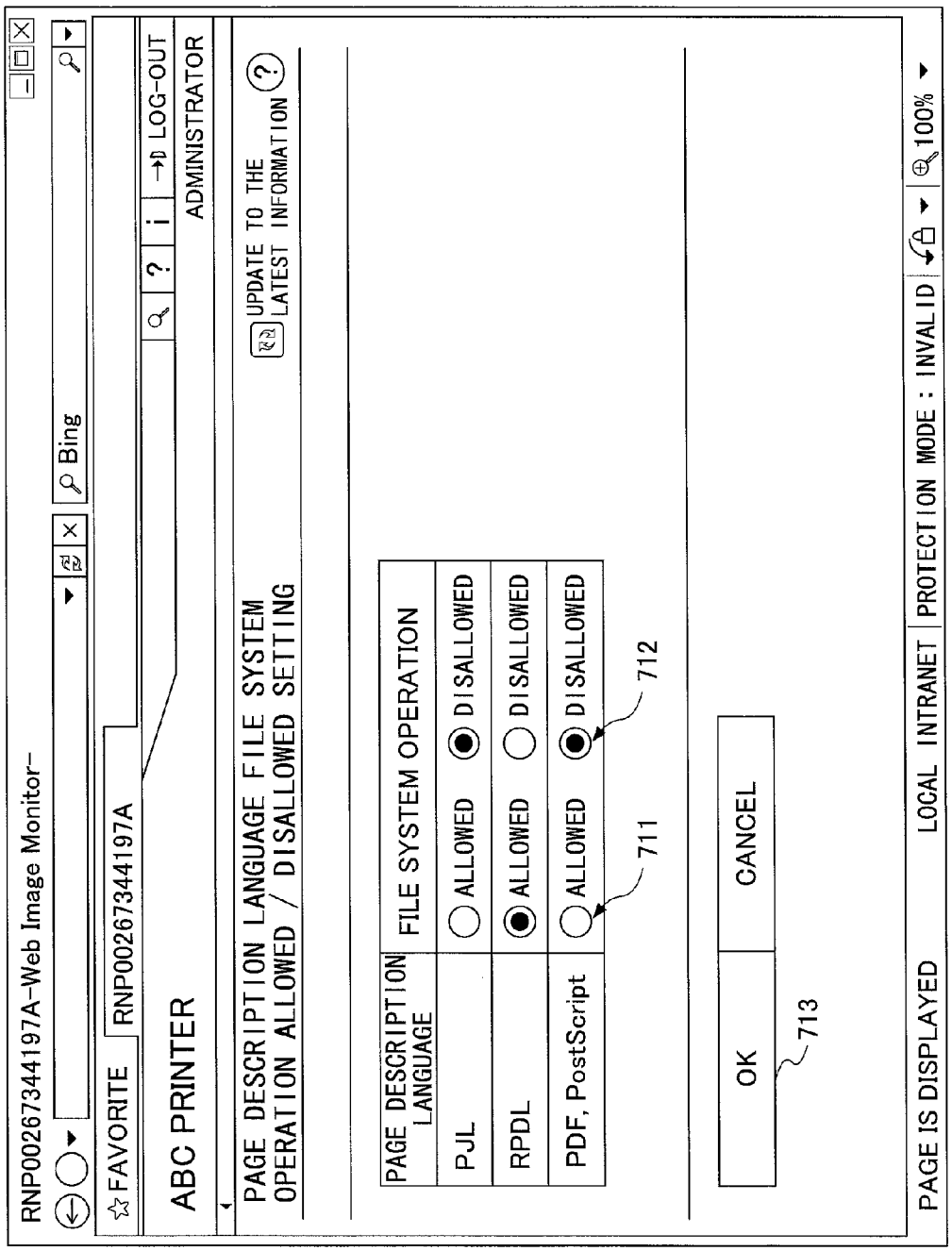

FIG. 7B is a diagram showing an example of the operations approval/disapproval setting screen which is displayed on the printer administrator's PC 200, when the "page description language file system operation approval/disapproval setting" button 706 is pressed. For each of the page description languages, radio buttons 711 and 712 indicating "allowed" and "disallowed," respectively, are displayed. The radio buttons 711 and 712 are displayed in a state in which one of the radio buttons 711 and 712 is selected, in accordance with the contents which have already been set (the initial setting or the contents which have been set by the printer administrator in the past).

The printer administrator decides for which page description languages the file access is allowed and for which page description languages the file access is disallowed. For each of the page description languages, the printer administrator turns on one of the radio buttons 711 and 712, and turns off the other one of the radio buttons 711 and 712. After the setting, when the printer administrator presses the OK button 713, the contents of the setting of the operation allowed/disallowed setting table 41 are transmitted to the setting reception processing unit 31.

In FIG. 7B, the settings of the PDF and the PostScript are the same. However, the setting of the PDF and the setting of the PostScript may be separated.

FIG. 8A is a diagram showing an example of a screen which is displayed on the user's PC 300. Since the user may not log in as a printer administrator, the user may not set the operation allowed/disallowed setting table 41. However, the user may confirm the current setting of the operation allowed/disallowed setting table 41. The user's PC 300 displays, for each of the page description languages, whether file access is allowed.

Figure 8B:
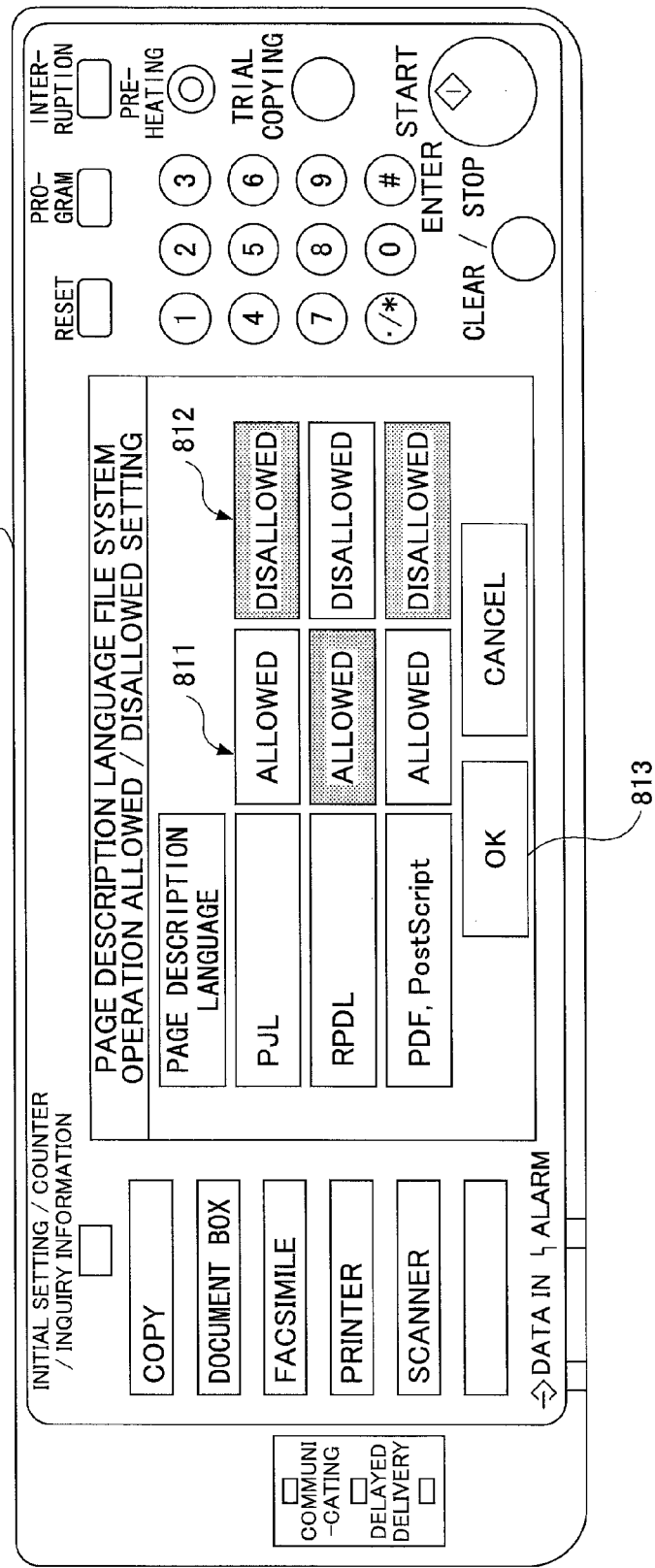

The printer administrator may set the operation allowed/disallowed setting table 41 through the operations panel 125. FIG. 8B is a diagram showing an example of the operation approval/disapproval setting screen which is shown in the operations panel 125. The printer administrator inputs the ID and the password by operating hard keys and/or soft keys, and thereby the printer administrator logs in to the system. By doing this, the operations approval/disapproval setting screen is displayed as shown in FIG. 8B. In the operations panel 125, for each of the page description languages, an "allow" button 811 and a "disallow" button 812 are displayed. The button selected by the printer administrator is displayed while being highlighted. When the printer administrator presses an OK button 813, the setting of the operation allowed/disallowed setting table 41 is accepted by the setting reception processing unit 31.

Figure 9:
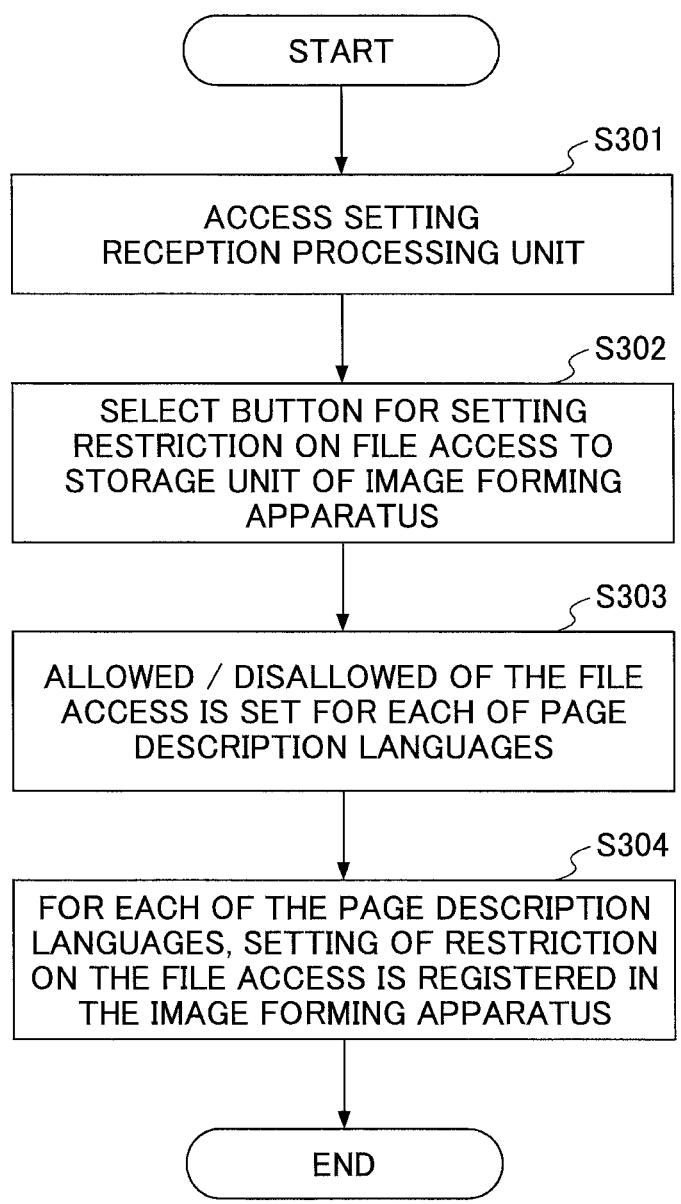
FIG. 9 is a flowchart showing an example of a procedure for setting the operation allowed/disallowed setting table through a network by the printer administrator.

FIG. 9 is a flowchart showing an example of a procedure for setting the operation allowed/disallowed setting table 41 by the printer administrator through the network 400.

First, the printer administrator inputs the IP address of the image forming apparatus 100 to the browser, and the printer administrator communicates with the setting reception processing unit 31 of the image forming apparatus 100 (S301). With this, the printer administrator's PC 200 displays the menu screen of FIG. 7A.

The printer administrator retrieves the HTML data for setting the operation allowed/disallowed setting table 41 from the image forming apparatus 100 by selecting the "page description language file system operation approval/disapproval setting" button 706 for setting the operation allowed/disallowed setting table 41 from the menu screen (S302). Then, the browser parses the HTML data, and thereby the screen of FIG. 7B is displayed.

By operating the printer administrator's PC 200, the printer administrator makes setting of "allow" or "disallow" on file access for each of the page description languages, which are supported by the image forming apparatus 100 (S303). After setting, by pressing the OK button 713, the setting of "allow" or "disallow" on the file access is transmitted to the image forming apparatus 100 for each of the page description languages.

The setting reception processing unit 31 receives the setting of the operation allowed/disallowed setting table 41 through the network I/F unit 36, and registers the setting in the operation allowed/disallowed setting table 41 (S304).

[File access control depending on PDL]

Figure 10:
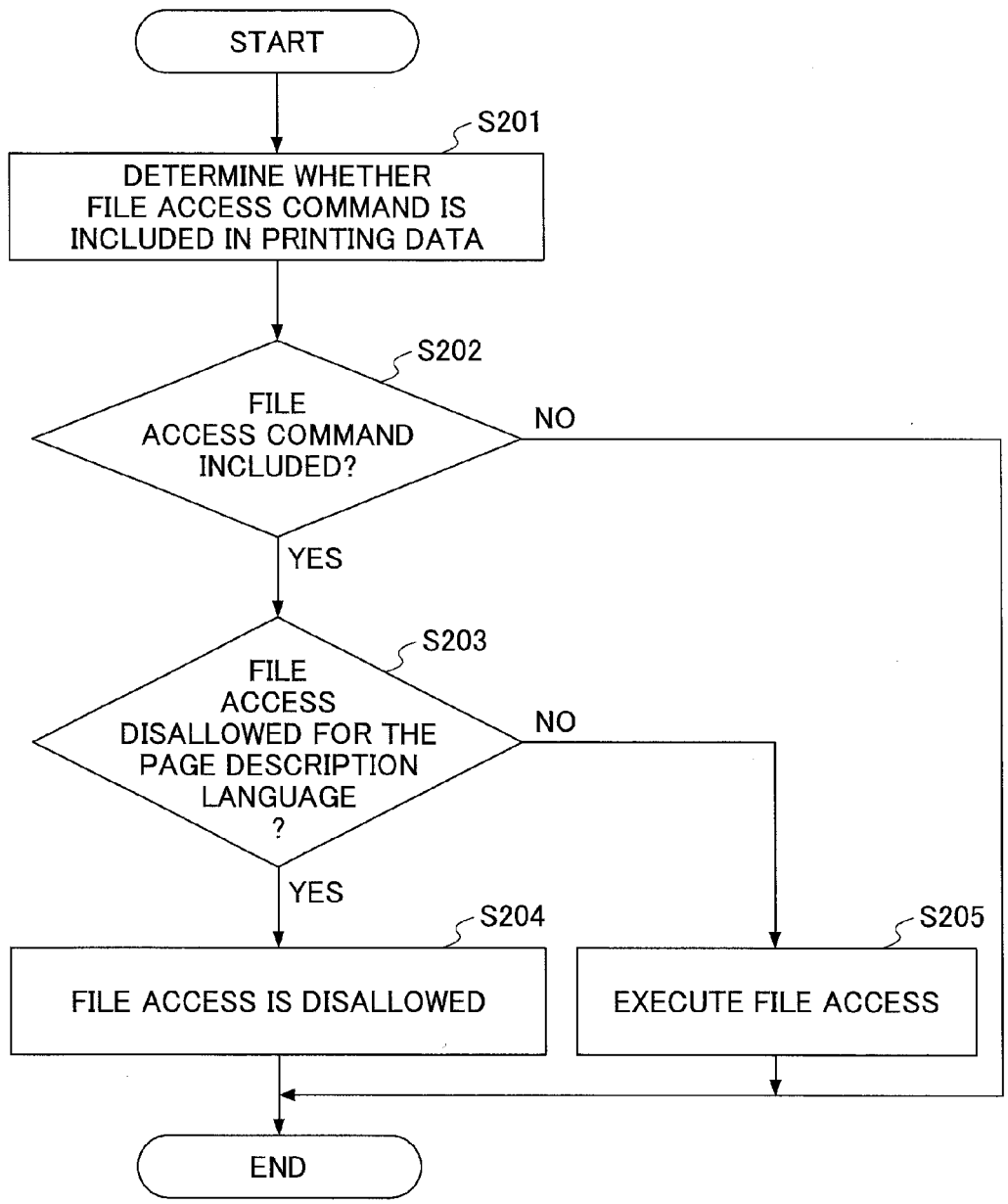
FIG. 10 is a flowchart showing an example of a procedure for the image forming apparatus to determine whether to access a file, depending on the page description language (access allowed)

FIG. 10 is a flowchart of an example of a determination procedure by the image forming apparatus 100 of whether to perform file access depending on a type of the page description language. The procedure of FIG. 10 starts when the user's PC 300 transmits printing data.

First, the determination unit 42 of the image processing IC 33 determines whether a file access command is included in the printing data (S201).

When no file access commands are included in the printing data (S202: NO), since it is not necessary to perform file access, the procedure of FIG. 8 is terminated. In this case, the printing is performed in accordance with the printing data.

When a file access command is included in the printing data (S202: YES), the determination unit 42 identifies a page description language, with which the printing data is described. Then, by referring to the operation allowed/disallowed setting table 41, the determination unit 42 determines whether file access by the identified page description language is prohibited (S203).

When the file access is prohibited (S203: YES), the image processing IC 33 terminates the procedure without accessing a file of the storage unit 35 (S204).

When the file access is not prohibited (S203: NO), the image processing IC 33 accesses a file of the storage unit 35 (S205).

In this example, step S203 follows step S202. However, the embodiment is not limited to this order. For example, step S202 may follow step S203.

Figure 11:
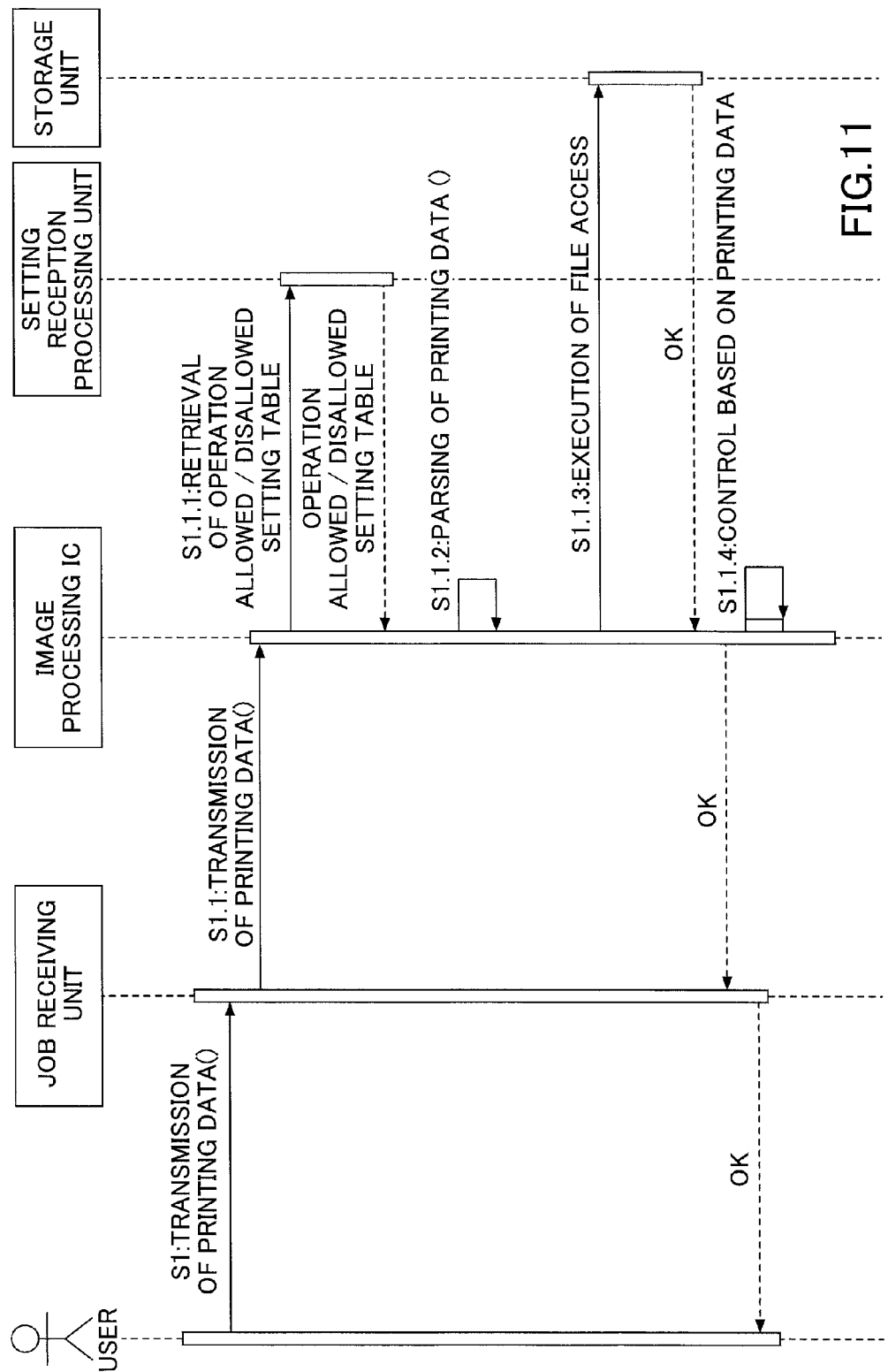
FIG. 11 is a sequence diagram showing an example of a procedure for the image forming apparatus to access a file in accordance with the page description language (access disallowed)

FIG. 11 is a sequence diagram showing an example of a procedure for the image forming apparatus 100 to access a file, depending on a type of the page description language.

S1: A user creates printing data in the user's PC 300. The printing data includes a file access command. Here, it is assumed that file access based on the page description language, with which the printing data is described, is allowed. The user's PC 300 transmits the printing data to the image forming apparatus 100. After receiving the printing data, the network I/F unit 36 of the image forming apparatus assigns the job to the job receiving unit 32.

S1.1: The job receiving unit 32 transmits the printing data to the image processing IC 33.

S1.1.1: The determination unit 42 of the image processing IC 33 reads out the operation allowed/disallowed setting table 41 from the setting reception processing unit 31.

S.1.1.2: The determination unit 42 performs the determination, which is described below.

The determination unit 42 determines (i) as to whether a file access command is included in the printing data, and when the file access command is included, the determination unit 42 determines (ii) as to whether the file access based on the page description language, with which the printing data is described, is allowed in the operation allowed/disallowed setting table 41. The determination (i) corresponds to the determination in step S202 of FIG. 10, and the determination (ii) corresponds to the determination in step S203 of FIG. 10.

S1.1.3: Since the file access based on the page description language, with which the printing data is described, is allowed, the image processing IC 33 accesses a file in the storage unit 35. Namely, the image processing IC 33 creates a directory in the storage unit 35, or the image processing IC 33 performs an operation to delete a file in the storage unit 35, for example.

Since the file access is performed in accordance with the file access command, the image processing IC 33 and the job receiving unit 32 report to the user's PC 300 that the control command is normally executed (OK). The user's PC 300 does not display that the control command is normally executed. However, the user's PC 300 may display an execution result of the control command.

S1.1.4: The parsing unit 45 (one of the parsing units 1-4) of the image processing IC 33 controls the image forming apparatus 100 in accordance with the control command, which is described in the printing data, and image processing is performed as usual.

Figure 12:
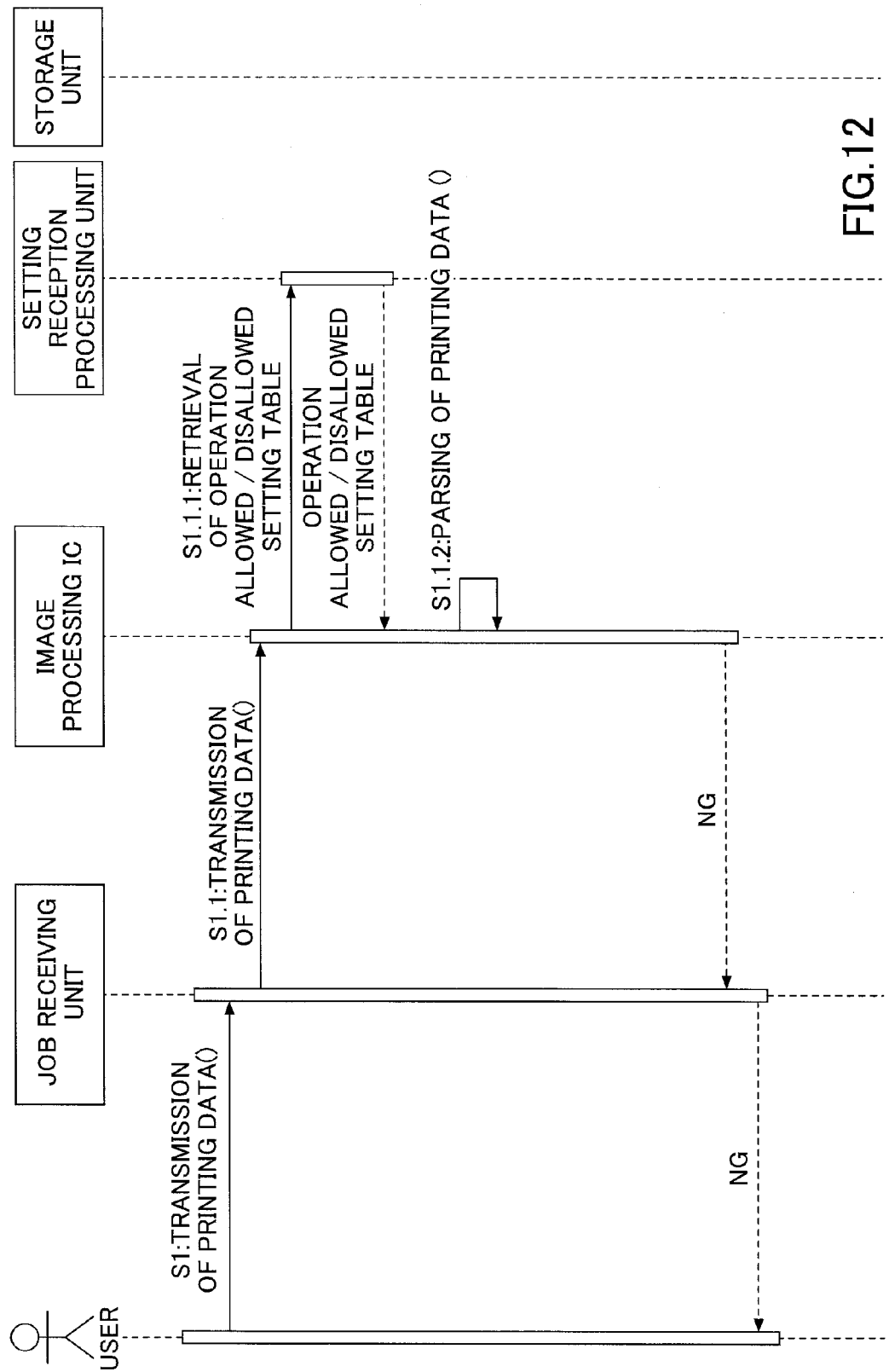
FIG. 12 is a sequence diagram showing an example of a procedure for the image forming apparatus to access a file in accordance with the page description language.

FIG. 12 is a sequence diagram showing an example of a procedure for the image forming apparatus 100 to access a file, depending on the type of the page description language.

S1: The user creates printing data in the user's PC 300. The printing data includes a file access command. Here, it is assumed that the file access based on the page description language, with which the printing data is described, is disallowed. The user's PC 300 transmits the printing data to the image forming apparatus 100. After receiving the printing data, the network I/F unit 36 of the image forming apparatus 100 assigns the job to the job receiving unit 32. The processes from S1.1 to S1.1.2 are the same as those of FIG. 11.

S1.1: The job receiving unit 32 transmits the printing data to the image processing IC 33.

S1.1.1: The determination unit 42 of the image processing IC 33 reads out the operations approval/disapproval table 41 from the setting reception processing unit 31.

S1.1.2: The determination unit 42 performs the determination, which is described below.

The determination unit 42 determines (i) as to whether a file access command is included in the printing data, and when the file access command is included, the determination unit 42 determines (ii) as to whether the file access based on the page description language, with which the printing data is described, is allowed in the operation allowed/disallowed setting table 41.

Since the file access based on the page description language, with which the printing data is described, is disallowed, the image processing IC 33 reports to the job receiving unit 32 that the control command is not executed normally (NG).

In this case, in order to report to the user that the control command is not executed, the user PC 300 may display an execution result of the control command.

FIG. 13 shows an example of a display screen of the execution result of the control command, which is displayed by the user's PC 300. In FIG. 13, the following sentences are displayed: "The file access is disallowed. The file access based on the selected page description language is disallowed." The user can recognize that the file access is disallowed by reading the execution result.

As described above, in the image forming apparatus 100 according to the embodiment, file access based on any page description language may be prohibited. By prohibiting file access based on a particular page description language, which is supported by the image forming apparatus 100, security of the storage unit can be improved.

[Another Example]

Hereinafter, there is explained another example of the image forming apparatus 100 according to the embodiment. In the image forming apparatus 100, effective time can be set in the operation some components of the image forming apparatus 100 function in the same manner as the above-described components of the image forming apparatus 100. Accordingly, components which are specific to the image forming apparatus 100 according to this example are mainly explained.

Figure 14:
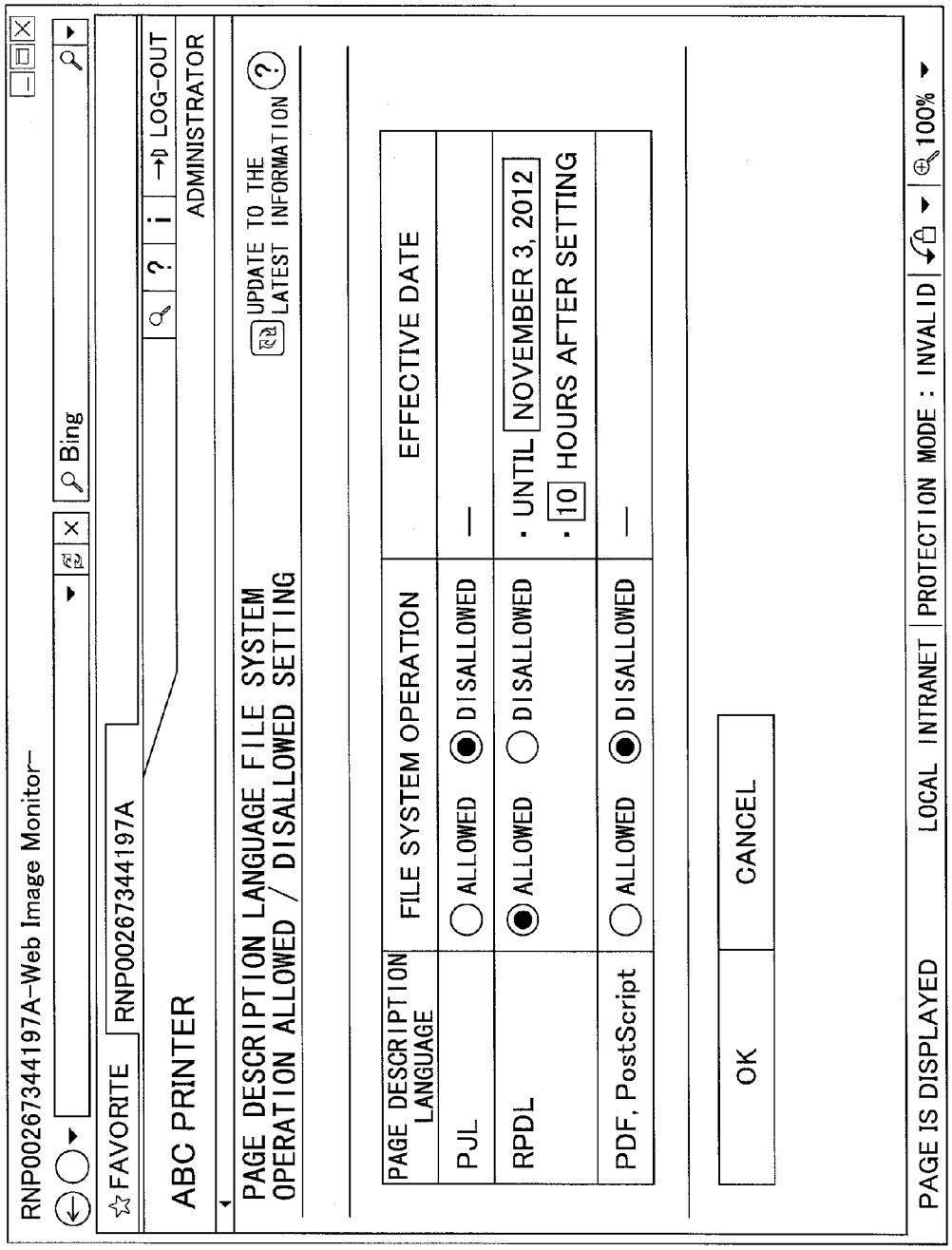
FIG. 14 is a diagram showing an example of an operation approval/disapproval setting screen, which is displayed on the printer administrator's PC.

FIG. 14 is a diagram showing an example of the operation approval/disapproval setting screen, which is displayed by the printer administrator's PC 200. The operation approval/disapproval setting screen of FIG. 14 is substantially the same as that of FIG. 7A. However, the operation approval/disapproval setting screen of FIG. 14 includes "expiration date" fields.

When the printer administrator selects "allowed" in the field of "file system operation," the effective data can be input. The "effective data" can be set in accordance with at least one of a method of specifying date and time of the expiration and a method of setting a time period until the expiration. When the date and time of the expiration and the time period until the expiration are set, the shorter of the two is prioritized.

Figure 15:
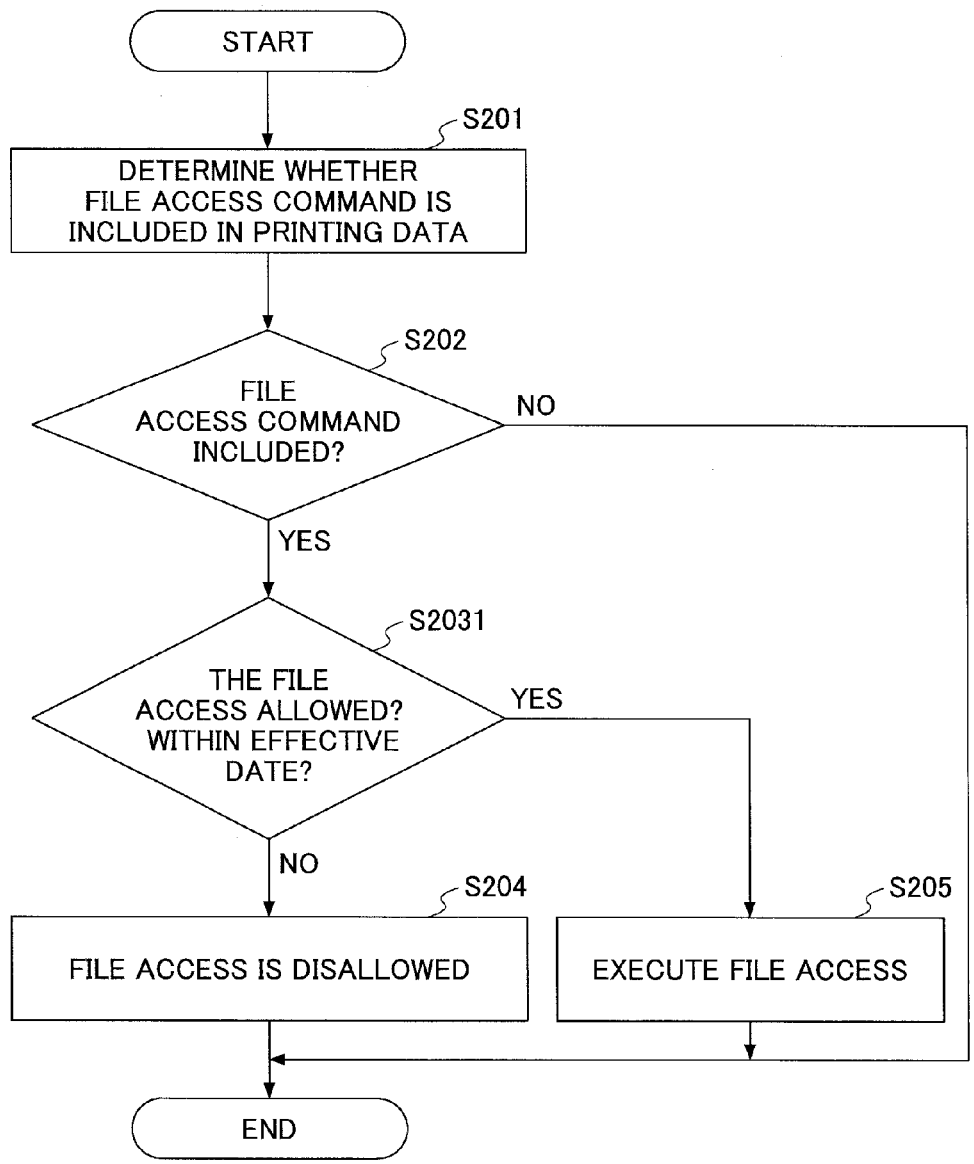
FIG. 15 is a flowchart showing another example of the determination procedure by the image forming apparatus 100 of whether to perform file access, depending on the type of the page description language.

FIG. 15 is a flowchart of an example of the determination procedure by the image forming apparatus 100 of whether to perform file access, depending on the type of the page description language. The procedure of FIG. 15 is almost the same as that of FIG. 10. The procedure of FIG. 15 is different from that of FIG. 10 in step S2031.

When the printing data includes a file access command (S202: YES), the determination unit 42 determines whether the corresponding right of file access is still effective (S2031). When the effective date is specified by the date and time, the determination unit 42 retrieves calendar information of a real time clock (RTC) from the CPU 114, and the determination unit 42 compares current date and time with the specified date and time. When the effective date is specified by the time period until the expiration, the start time at which the effective date is set is recorded. Then, the time difference between the current time and the start time is calculated, and the determination unit 42 compares the calculated time difference and the time period until the expiration.

As a result of the comparison, if it is determined that file access is allowed and the right of the file access in still effective (S2031: YES), the image processing IC 33 accesses a file of the storage unit 35 (S205).

Even if file access is allowed, if the right of the file access is expired (S2031: NO), the image processing IC 33 does not access any file of the storage unit 35 (S204).

In FIG. 15, the determination unit 42 determines the effective date. Instead, the setting reception processing unit 31 may reset the operation allowed/disallowed setting table 41. Namely, when the effective date which is set by the user is expired, the setting reception processing unit 31 may return the setting of the "file system operation" of the corresponding page description language, for which the effective date has been set, to the default setting. Here, the default setting is "disallowed," for example. In this method, the procedure of the determination unit 42 is the same as that of FIG. 10.

With the image forming apparatus 100 according to this example, when the file access is to be temporarily allowed so as to perform maintenance of the file system, for example, since it is not necessary to return the current setting to the setting of "disallowed," after performing the maintenance, convenience of the image forming apparatus 100 can be enhanced.

In this example (FIG. 14), the effective date is established for the case in which the file access is "allowed." However, the effective date may be established for a case in which the file access is "disallowed." In this case, after the effective date is expired, the file access is allowed. Such a configuration is effective for a case in which file access is to be allowed in a normal situation of an office, but the file access is to be temporarily prohibited, because of presence of an external co-worker or a temporary worker in the office.

The printer administrator may suitably select, for each of the page description languages, whether the effective date is to be set for allowing the file access or for disallowing the file access.

[Another Example]

Hereinafter, there is explained an example of a printing system 600, in which the setting reception processing unit 31 is disposed outside the image forming apparatus 100.

Figure 16:
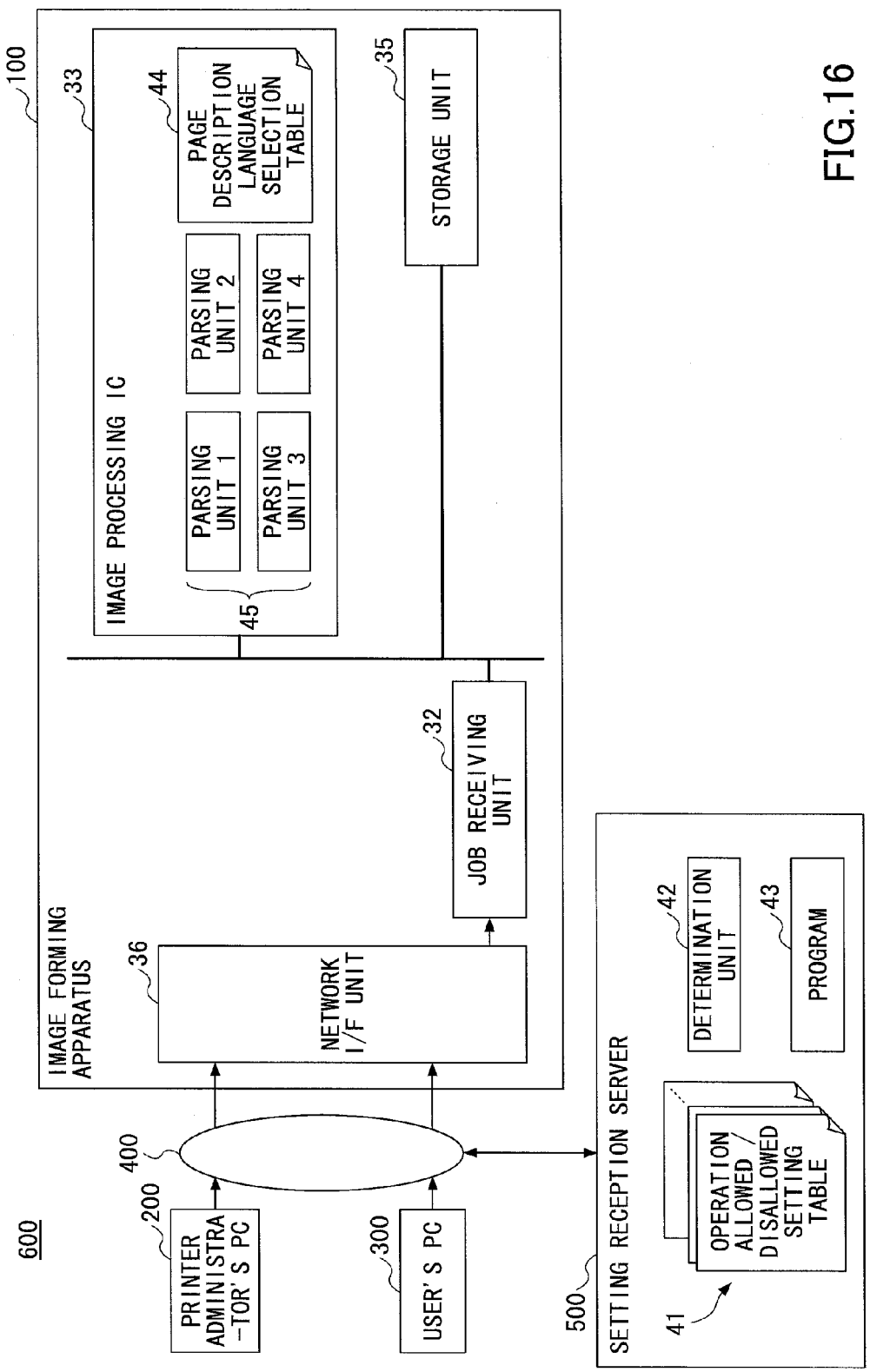
FIG. 16 is a schematic configuration diagram of an example of a printing system.

FIG. 16 is a schematic configuration diagram of the example of the printing system 600. The printing system 600 includes the printer administrator's PC 200; the user's PC 300, the image forming apparatus 100; and a setting reception server 500. The image forming apparatus 100 does not include the setting reception processing unit 31 of the first one of the above-described examples. Instead of the setting reception processing unit 31, the setting reception server 500 is included in the printing system 600. The determination unit 42 and the program 43, which are included in the image processing IC 33 in the other examples, are included in the setting reception server 500 in this example. With such a configuration, it suffices if the image forming apparatus 100 includes a usual image processing IC 33. Thus, the increase in the cost of the image forming apparatus 100 can be prevented.

The setting reception server 500 is an information processing device including a CPU, a ROM, a RAM, a HDD, a network card, a mouse, and a keyboard, etc. The HDD stores the program 43, which is shown in FIG. 16.

In this example, the printer administrator sets the operation allowed/disallowed setting table 41 in the setting reception server 500. Here, the printer administrator manages (recognizes) the IP address of the setting reception server 500. The setting method of the operation allowed/disallowed setting table 41 is the same as that of the first one of the above-described examples. However, in this example, the operation allowed/disallowed setting table 41 may be registered for each image forming apparatus. Accordingly, the setting reception server 500 includes a plurality of the operation allowed/disallowed setting tables 41. Alternatively, a single operation allowed/disallowed setting table 41 may be shared among a plurality of the image forming apparatuses 100.

When the setting of the operation allowed/disallowed setting table 41 is made by using the operation panel, the browser function of the image forming apparatus 100 is utilized. Namely, the image forming apparatus 100 communicates with the setting reception server 500 by the browser. The printer administrator can register the operation allowed/disallowed setting table 41 in a manner which is similar to the case of using the printer administrator's PC 200.

FIG. 17 is a sequence diagram of an example of a procedure for the image forming apparatus 100 to perform file access, depending on the page description language.

S1: The user creates printing data in the user's PC 300. The user's PC 300 transmits the printing data to the image forming apparatus 100. After receiving the printing data, the network I/F unit 36 of the image forming apparatus 100 assigns the job to the job receiving unit 32.

S1.1: The job receiving unit 32 transmits the printing data to the setting reception server 500.

S1.1.1: The determination unit 42 of the setting reception server 500 reads out the operation allowed/disallowed setting table 41.

S1.1.2: The determination unit 42 parses the printing data. The parsing includes (i) determination as to whether a file access command is included in the printing data, and when the file access command is included, the parsing includes (ii) determination as to whether the file access based on the page description language, with which the printing data is described, is allowed in the operation allowed/disallowed setting table 41.

S1.1.3: The setting reception server 500 transmits a determination result (OK/NG) to the image forming apparatus 100. The subsequent process depends on whether the determination result is OK or NG. When the printing data includes a file access command, and the file access based on the page description language, with which the printing data is described, is allowed, the process proceeds to S1.2. When the printing data includes a file access command, but the file access based on the page description language, with which the printing data is described, is disallowed, the process proceeds to S1.4.

S1.2: Since the file access is allowed for the page description language, with which the printing data including the file access command is described, the job receiving unit 32 transmits the printing data to the image processing IC 33.

S1.2.1: The image processing IC 33 accesses a file in the storage unit 35. Namely, the image processing IC 33 creates a directory in the storage unit 35, or the image processing IC 33 deletes a file in the storage unit 35, for example. Since the file access is performed in accordance with the file access command, the image processing IC 33 and the job receiving unit 32 reports to the user's PC 300 that the control command is normally executed (OK).

S1.3: The parsing unit 45 (any one of the parsing units 1-4) of the image processing IC 33 controls the image forming apparatus 100 in accordance with the control command which is described in the printing data, and the image forming apparatus 100 performs a usual image forming process.

S1.4: Since the file access is not allowed for the page description language, with which the printing data including the file access command is described, the job receiving unit 32 reports to the user's PC 300 that the control command is not executed normally (NG).

According to this example, since the file access can be regulated similar to the first one of the above-described examples by using an external server, the increase in the cost of the image forming apparatus 100 can be prevented. Further, it is possible to commonly regulate file access with respect to a plurality of the image forming apparatuses 100. In this case, the file access can be commonly regulated to the image forming apparatuses 100 by a single setting of the operation allowed/disallowed setting table 41.

The present invention is not limited to the specifically disclosed embodiments, and variations and modifications may be made without departing from the scope of the present invention.

The present application is based on and claims the benefit of priority of Japanese Priority Application No. 2012-241086 filed on Oct. 31, 2012, the entire contents of which are hereby incorporated herein by reference.

What is claimed is:

1. An image forming apparatus configured to connect to a device, the image forming apparatus comprising:
a memory device configured to,
store, for each of a plurality of types of page description languages for describing printing data, a control command for executing a desired control, and
store, for each of the plurality of types of page description languages, permission information indicating whether execution of the desired control is allowed, the permission information indicating whether execution of control commands associated with one of the page description language requires access to the memory device;
a receiver configured to receive printing data transmitted from the device, the received print data being described in one of the page description languages; and
a processor configured to,
determine whether the stored control command is described in the received printing data,
determine, when the stored control command is described in the received print data, whether the execution of the desired control is allowed based on the permission information described in the one of the page description languages,
execute the control command described in the printing data when the execution of the desired control is allowed such that the control command is executed when the permission information indicates the control command described in the page description language does not require access to the memory device, and
prevent execution of the control command described in the printing data when the execution of the desired control is disallowed.

2. The image forming apparatus according to claim 1, wherein the stored control command causes the processor to access the memory device storing desired information.

3. The image forming apparatus according to claim 2, wherein the memory device is one of a hard disk drive (HDD), a SD memory, RAM, and a ROM.

4. The image forming apparatus according to claim 1, wherein the processor is further configured to,
receive, for each of the types of the page description languages, a setting of whether the desired control is allowed;
manage setting information, wherein the setting information defines, for each of the types of the page description languages for describing the printing data, the setting of whether the desired control is allowed, and
manage the setting information based on the settings.

5. The image forming apparatus according to claim 4, wherein the processor is configured to,
transmit setting display information to the device, and receives the settings of a setting column from the device, wherein the setting display information is for causing the device to display the setting column for receiving the setting of whether the desired control is allowed for each of types of the page description languages, and
manage the setting information based on the settings of the setting column.

6. The image forming apparatus according to claim 5, the processor is configured to,
display the setting column on a display included in the image forming apparatus, based on the setting display information; and
receive the settings of the setting column, the settings of the setting column being displayed on the display.

7. The image forming apparatus according to claim 4, wherein the processor is configured to,
manage first user identification information for identifying a first user, wherein the first user is able to manage the setting information,
receive second user identification information for identifying a second user of the device from the device,
determine whether the second user identification information is included in the first user identification information, and
manage the setting information based on the settings, when the processor determines that the second user identification information is included in the first user identification information.

8. The image forming apparatus according to claim 4, wherein processor is configured to receive an effective date of the setting of whether the desired control is allowed.

9. The image forming apparatus according to claim 1, wherein
the processor is configured to,
parse the corresponding types of the page description languages, and
perform a rendering process corresponding to the type of the page description language, and
the printing data received by the receiver is described in the page description language.

10. The image forming apparatus according to claim 1, wherein the processor is configured to,
control execution of the desired control, and
report to the device that the control command corresponding to the desired control is unexecutable, when the processor prevents execution of the control command corresponding to the desired control.

11. An instruction execution method of executing a control command by an image forming apparatus configured to connect to a device, the method comprising:
storing, for each of a plurality of types of page description languages for describing printing data, control command for executing a desired control;
store, for each of the plurality of types of page description languages, permission information indicating whether execution of the desired control is allowed, the permission information indicating whether execution of control commands associated with one of the page description language requires access to a memory device;
receiving printing data transmitted from the device;
determining whether the stored control command is described in the received printing data;
determining whether the execution of the desired control by the page description language that describes the printing data is allowed when the stored control command is described by the received printing data; and
executing the control command that is described in the printing data when the determining determines that the execution of the desired control is allowed such that the control command is executed when the permission information indicates the control command described in the page description language does not require access to the memory device; and preventing execution of the control command that is described in the printing data when the determining determines that the execution of the desired control is disallowed.

12. A printing system including an image forming apparatus and a device, wherein the image forming apparatus is configured to connect to the device, and wherein the image forming apparatus comprises:
a memory device configured to,
store, for each of a plurality of types of page description languages for describing printing data, control command for executing a desired control, and
store, for each of the plurality of types of page description languages, permission information indicating whether execution of the desired control is allowed, the permission information indicating whether execution of control commands associated with one of the page description language requires access to the memory device;
a receiver configured to receive printing data transmitted from the device, the received print data being described in one of the page description languages; and
a processor configured to,
determine whether the stored control command is described in the received printing data,
determine, when the stored control command is described in the received print data, whether the execution of the desired control is allowed based on the permission information described in the one of the page description languages,
execute the control command described in the printing data when the execution of the desired control is allowed such that the control command is executed when the permission information indicates the control command described in the page description language does not require access to the memory device, and
prevent execution of the control command described in the printing data when the execution of the desired control is disallowed.

13. The printing system of claim 12, wherein the stored control command causes the processor to access the memory device storing desired information.

14. The printing system of claim 12, wherein:
the processor is further configured to,
parse the corresponding types of the page description languages, and
perform a rendering process corresponding to the type of the page description language, and
the printing data received by the receiver is described in the page description language.

15. The printing system of claim 12, wherein the processor is configured to,
control execution of the desired control, and
report to the device that the control command corresponding to the desired control is unexecutable, when the processor prevents execution of the control command corresponding to the desired control.

16. The printing system of claim 12, wherein the processor is configured to,
receive, for each of the types of the page description languages, a setting of whether the desired control is allowed;
manage setting information, wherein the setting information defines, for each of the types of the page description languages for describing the printing data, the setting of whether the desired control is allowed, and
manage the setting information based on the settings.

17. The printing system of claim 12, wherein the processor is configured to,
transmit setting display information to the device, and receives the settings of a setting column from the device, wherein the setting display information is for causing the device to display the setting column for receiving the setting of whether the desired control is allowed for each of types of the page description languages, and
the management unit is configured to manage the setting information based on the settings of the setting column.

18. The printing system of claim 17, wherein the processor is configured to,
manage first user identification information for identifying a first user, wherein the first user is able to manage the setting information,
receive second user identification information for identifying a second user of the device from the device,
determine whether the second user identification information is included in the first user identification information, and
manage the setting information based on the settings, when the processor determines that the second user identification information is included in the first user identification information.

19. The printing system of claim 12, wherein the processor is configured to,
display the setting column on a display included in the image forming apparatus, based on the setting display information; and
receive the settings of the setting column, the settings of the setting column being displayed on the display.

* * * * *